UNITED STATES PATENT OFFICE.

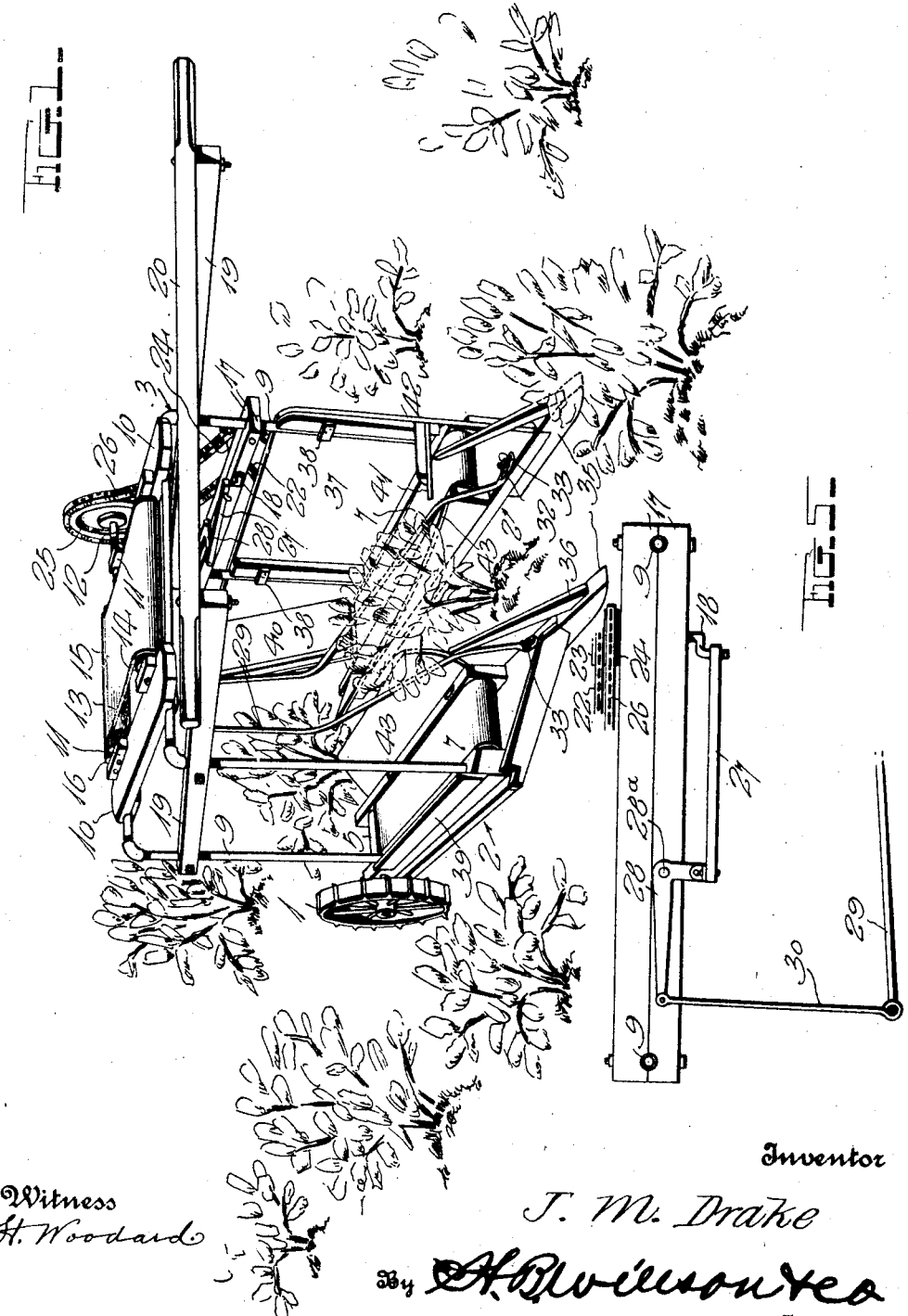

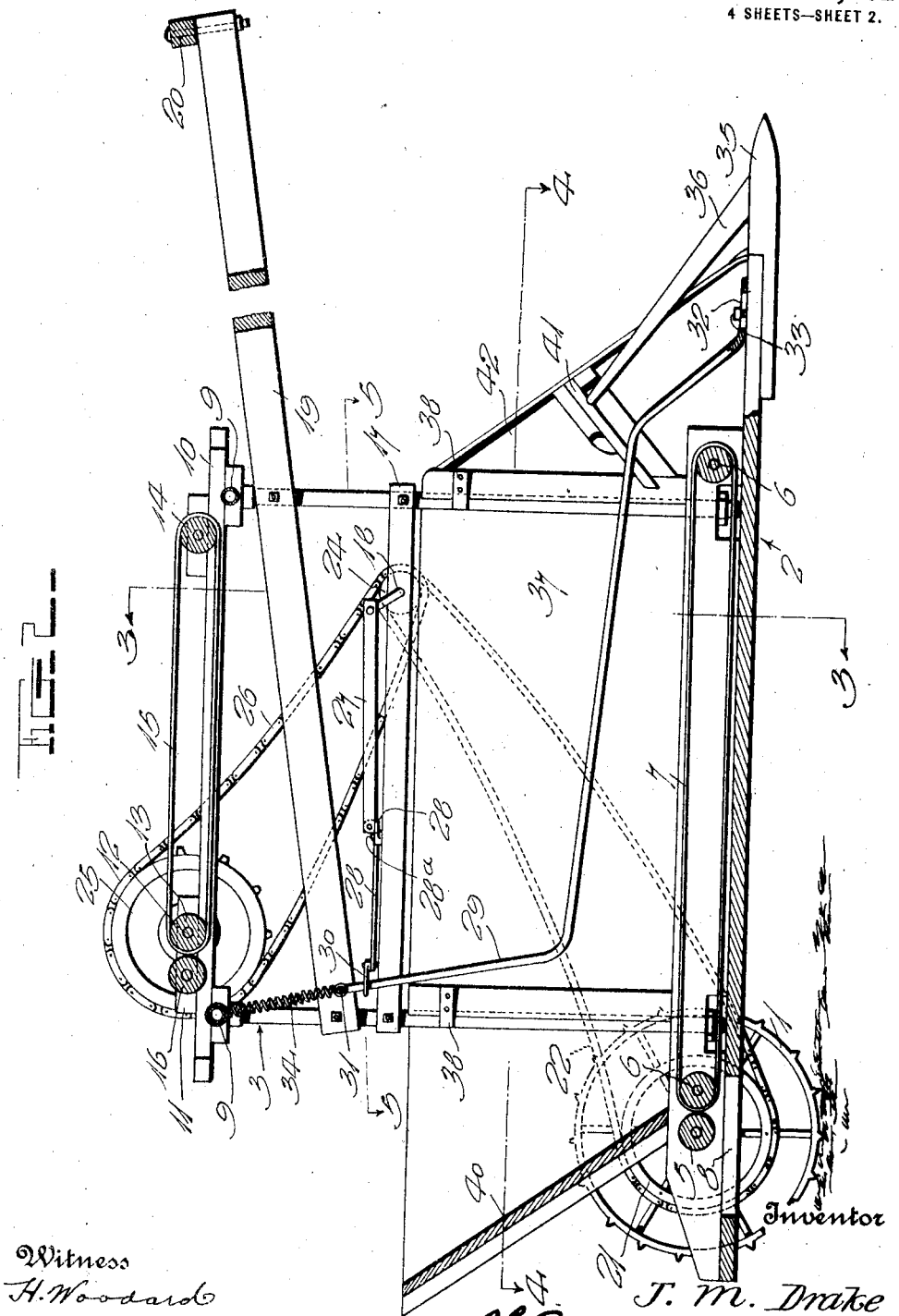

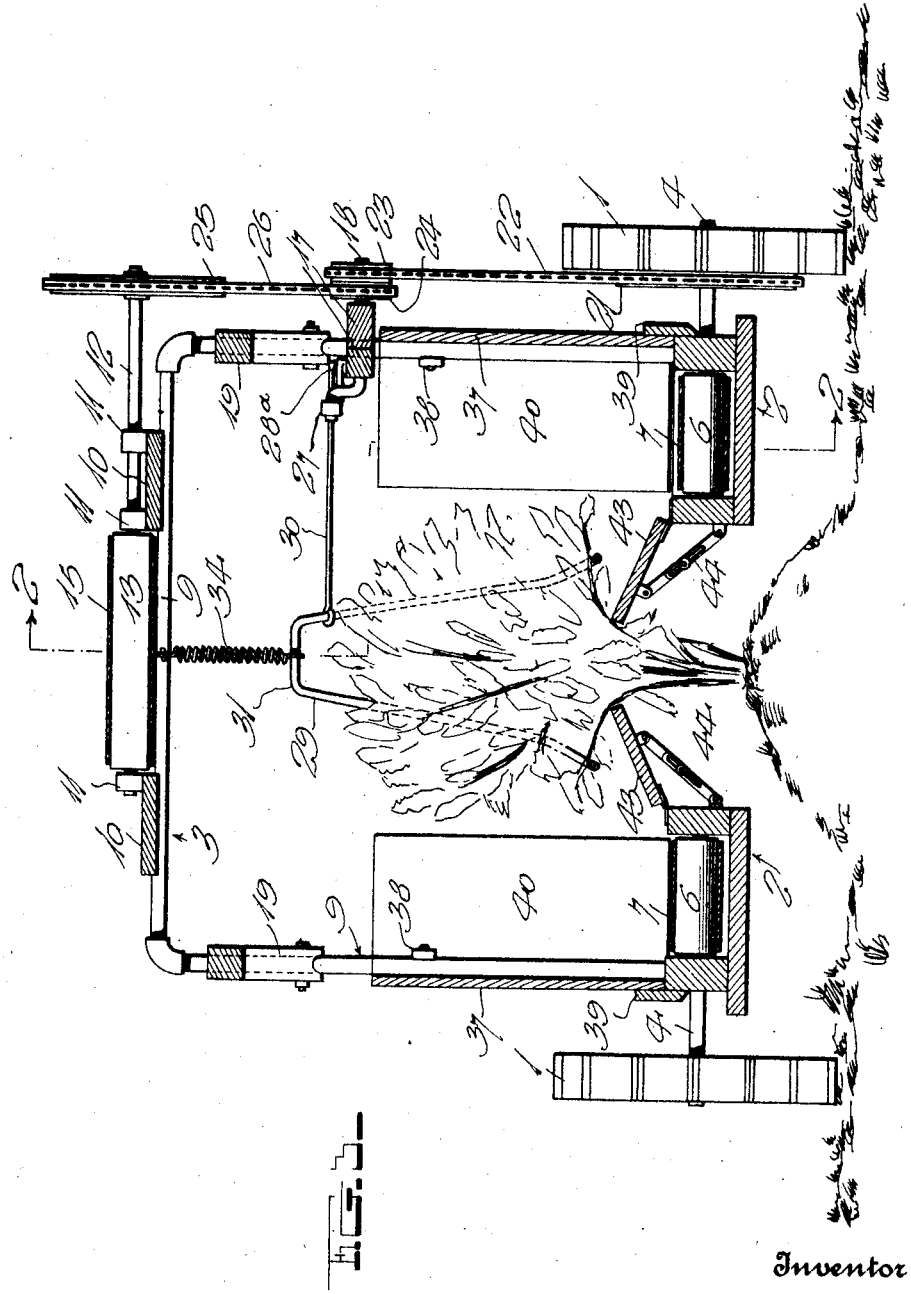

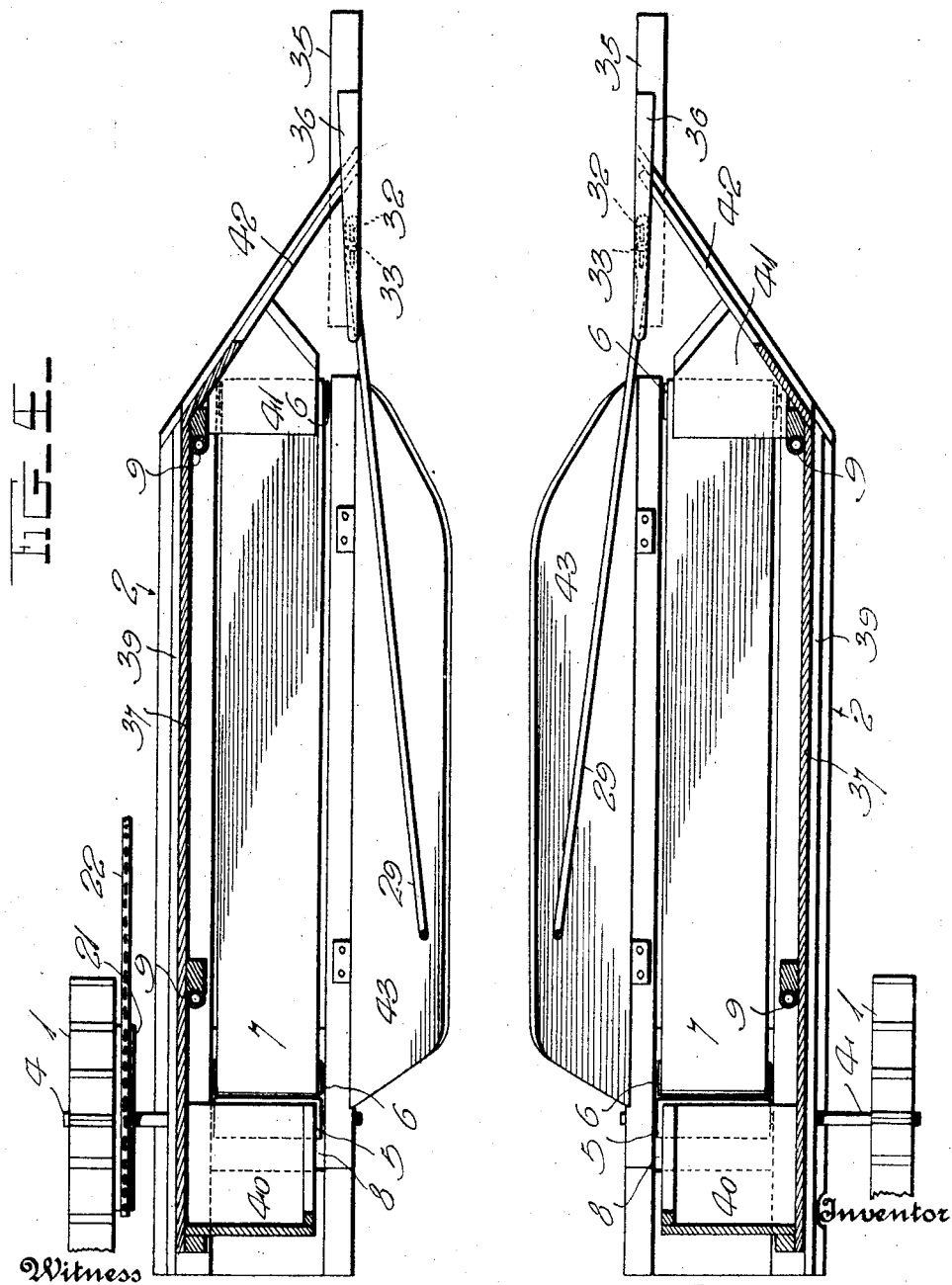

JAMES MONRO DRAKE, OF SHAWANO, WISCONSIN.

POTATO-BUG-TRAPPING MACHINE.

1,344,119. Specification of Letters Patent. Patented June 22, 1920.

Application filed November 28, 1919. Serial No. 341,085.

*To all whom it may concern:*

Be it known that I, JAMES MONRO DRAKE, a citizen of the United States, residing at Shawano, in the county of Shawano and State of Wisconsin, have invented certain new and useful Improvements in Potato-Bug-Trapping Machines; and I do declare the following to be a full, clear, and exact description of the invention, such as will enable others skilled in the art to which it appertains to make and use the same.

This invention relates to potato-bug trapping machines, and more specifically to an improved machine for dislodging potato-bugs from the potato-vines and killing them.

One object of this invention is to generally improve upon devices of this character by providing an improved machine which not only kills the potato-bugs which fall or descend from the vines when they are shaken, but also kills the bugs or insects which ascend or fly upward from the vines.

Another object of this invention is to provide an improved device for lifting the plant-stems so that the foliage is superjacent to the lower insect-traps, this plant shaker being subjacent to the upper insect-trap.

A further object of this invention is to provide a device of this character with adjustable and detachable deflector plates for directing the insects onto the traps.

Other objects and advantages may become apparent to persons who read the following details of description in connection with the accompanying drawings in which:

Figure 1 is a perspective view illustrating my improved insect trapping machine in position for being operated.

Fig. 2 is a longitudinal vertical sectional view, the section being taken substantially along the line 2—2 of Fig. 3.

Fig. 3 is a transverse vertical sectional view, the section being taken substantially along the line 3—3 of Fig. 2.

Fig. 4 is a horizontal sectional view, the section being taken along the line 4—4 of Fig. 2.

Fig. 5 is a horizontal sectional detail view, the section being taken along the line 5—5 of Fig. 2.

Referring to these drawings in detail, in which similar reference characters correspond with similar parts throughout the several views; the invention comprises the device hereinafter described and claimed as follows:

Considering the invention in a broad aspect, the machine comprises a main frame, a pair of ground-wheels 1, a lower insect-trap, an upper insect-trap, a device for raising and shaking the stems of plants, and transmission means operatable by one of the ground-wheels for operating an upper and lower insect-trap and also operating the plant-shaking device.

The main frame comprises two lower sections 2 and an upper section 3, the latter being substantially in the shape of an inverted U and having the lower ends of its upright portions rigidly united with the lower frame sections while its upper end extends horizontally across the lower frame sections 2. The lower frame sections are secured in parallel spaced relation to one another by means of the upper section, so that one of the lower sections may travel along one side of a row of plants while the other lower section travels along the other side of the row of plants. Each lower frame section 2 comprises a trough-like structure in which a shaft 4 is rotatably mounted, suitable bearings being provided through the walls of the trough-like structure, and the wheels 1 support and rotate the shafts 4 when the machine is pushed or pulled along the rows of plants. Rollers 5 are mounted on the shafts 4, within the trough-like structures 2, and impart rotary movement to two pairs of rollers 6 which are also mounted in the trough-like structure and are journaled in the walls thereof. Each pair of rollers 6 carries an endless belt 7, and it will be seen that each belt 7 and its pair of rollers 6 constitutes a conveyer to receive insects which fall from the potato-vines or other plants and convey them to the rear end of the machine and thence downward between the belts 7 and rollers 5, thereby crushing and killing the insects. An aperture 8 is provided in each lower frame section for permitting the dead insects to drop on the ground.

The upper frame section preferably comprises two yokes 9 of gas-pipe or other metal bars, the upper ends of these yokes being connected by means of plates or bars 10, which are secured in their respective places by any appropriate means.

These members are provided with bearings 11 in which a shaft 12 is journaled, and this shaft carries a drum or roller 13 which coacts with a drum or roller 14 for carrying an endless belt 15. The members 13, 14 and 15 constitute an upper conveyer, and together with a pressing roller 16 constitute an upper insect trap, as will hereinafter be explained.

The main frame further comprises a pair of beams 17 which are secured together and to the frame 9 by bolts or other appropriate means, and these beams 17 combine to form a journal-bearing in which a crankshaft 18 is journaled. The rigid main frame structure is completed by the provision of two shafts 19 and a handle-bar 20, the shafts 19 being inclined downward and rearward, and the handle-bar 20 being secured on the front ends of the shafts 19.

A sprocket-wheel 21 is carried by one of the ground-wheels 1, and a sprocket-chain 22 meshes with this wheel and with a wheel 23 which is carried by the shaft 18 and operates to rotate the latter. This shaft also carries a sprocket-wheel 24 which imparts rotary movement to a sprocket-wheel 25 through the medium of a chain 26. It will be seen, therefore, that when the sprocket-wheel 21 is rotated by its ground-wheel 1, motion is transmitted to the elements 22, 23, 24, 26 and 25 to the shaft 12 which actuates the upper conveyer and insect-trap previously described. Moreover, it will be seen that the shaft 18 will be rotated, and its rotation imparts the reciprocatory movement to a pitman-rod 27. This pitman rod is pivotedly connected to a bellcrank or lever 28, and the latter is connected to a plant shaking member or rod 29 through the medium of a link 30, the latter being pivotally connected to the lever 28. The shaking-member or bent rod 29 is of the novel construction illustrated, comprising a bight 31 and slotted ends 32. These slotted ends are preferably secured to the respective lower frame sections 2 through the medium of headed fasteners 33, and the two similar halves of the shaking rod are approximately parallel, but are somewhat convergent toward the bight 31. Moreover the plant-shaking rod is upwardly and inwardly inclined from its front end to its upper or inner end, and therefore, this rod is effective for raising the stems of potatoes or other plants as well as for shaking said stems for dislodging the insects therefrom. A helical spring 34 has its lower end connected to the bight 31 and has its upper end connected to one of the yokes 9. From the foregoing description, it will be seen that when the bellcrank or lever 28 is oscillated about its pivot 28ª (see Fig. 5), the rear end of the shaking rod 29 will be moved back and forth across the space between the lower frames 2, and the front ends of this rod slide forward and rearward while being held against lateral movement by the headed fasteners 33.

Two shoes or runners 35 are secured respectively on the front ends of the lower frame sections 2, and each shoe 35 is provided with an arm 36 which is upwardly and rearwardly inclined. Deflector plates or detachable side members 37 are secured to the uprights of the sections 9 by means of clips 38 and flanges 39, these flanges constituting upward extensions of the trough-like lower frame members 2. The clips 38 may be secured to the side plates 37 by means of one or more bolts or screws, and may be turned out of their effective positions by removing or loosening one or more of the screws. When these clips 38 are disengaged from the uprights 9, the plates 37 may be lifted out of engagement with the flanges 39 so that unobstructed access may be had to the interior portion of the machine.

Each side plate 37 is formed with a rear deflector 40, a front deflector 41 and a pair of guard members or plates 42 which support the deflectors 41. The guard plates 42 converge toward the front end of the machine, so as to guard and protect the lower conveyers, to prevent weeds and plant-stems from becoming entangled about the journals of these conveyers; and the upper edges of these plates are rearwardly and upwardly inclined so as to coöperate with the arms 36 for deflecting the plant-stems upwardly and inwardly over the deflectors 41 and the shaking rod 29. However, it should be understood that in the event the arms 36 are omitted or broken off, the machine would still be operative and efficient, (though perhaps less efficient than if the arms 36 are present), for the upwardly and rearwardly inclined front ends of the shaking rod 29 would coöperate with the shoes or runners 35 to raise the plant-stems from the ground to a substantially vertical position. In this connection, it should be understood that the front ends of the shoes 35 are sharp so as to enter the spaces between the ground and the plant-stems which lie thereon, the lower surfaces of the shoes 35 being turned slightly upward at their front ends, to prevent the shoes from entering the ground.

In order to increase the efficiency of this machine, adjustable deflector plates 43 are hinged to the lower frame sections, and extensible links 44 may be pivotally connected to these frame sections and to the deflector plates 42 as illustrated in Fig. 3, so that the inclination of the plates 43 may be varied according to the height of the plants being treated.

In the foregoing description of the lower insect-traps, it was explained that each conveyer 6—7 is driven by the roller 5.

The operation of this device is as follows:

As the machine is drawn forward while straddling the row of potatoes or other plants, the sharp front end of the shoes or runners 35 slide on the ground and raise the plant-stems which are lying on or adjacent to the ground, and the raising of the stems is continued by means of arms 36 and inclined front edges of the plates 42 until the plant-stems pass over the front deflectors or plates 41. The plant-stems then fall upon the approximately horizontal portions of the shaking rod 39, and this dropping of the stems, together with the shaking movements of the rod 29, causes some of the insects to fall while frightening others and causing them to fly from the plants. Those insects which fall upon the conveyer belts 7, or are directed thereon by the plates 40, 41, 43 and 37, are conveyed into the passage between the belts 7 and the rollers 5 and are crushed and dropped on the ground. On the other hand, a large number of those insects which fly upward alight on the belt 15 and are conveyed rearwardly into the passage between this belt and the roller 16. It should be understood that the crank shaft 18 performs the dual function of transmitting movement to the conveyer belt 15 and to the plant shaking device.

Although I have described this embodiment of my invention very specifically, it is not intended to limit this invention to these exact details of construction and arrangement, but changes may be made within the scope of the inventive ideas as implied and claimed.

What I claim as my invention is:

1. In a machine of the character described, a plant shaking device to engage and shake the plants and thereby dislodge insects from the plants, means, including runners which slide on the ground to raise the plant-stems and guide them into position to be shaken by said shaking device, a plurality of insect-traps, one of said traps being located below and another located above the part of said shaking device that engages with the plants, for trapping the insects that fall and those that rise from the plants, and means to carry said shaking device along a row of plants and to operate said shaker and traps.

2. In a machine of the character described, a main frame, a ground-wheel journaled to the rear end of said main frame and carrying said rear end, a sliding runner having a sharp front end to pass under and raise plant stems from the ground, a plant-shaking rod having its front end adjacent to the top of said runner and extending rearward from the latter and being upwardly inclined so as to continue the raising of the plant-stems to an approximately vertical position, means subjacent to the rear part of said plant-shaking rod for trapping insects which descend from the plants being shaken, means superjacent to said plant-shaking rod for trapping insects that arise from said plants, means operatable by said ground-wheel and including a crank-shaft journaled in the main frame between the upper and lower means for trapping insects, and means operatable by said crank-shaft to actuate said plant-shaking rod.

3. In a machine of the character described, a main frame, a ground-wheel journaled to the rear end of said main frame and carrying said rear end, a sliding runner having a sharp front end to pass under and raise plant stems from the ground, a plant-shaking rod having its front end adjacent to the top of said runner and extending rearward from the latter and being upwardly inclined so as to continue the raising of the plant-stems to an approximately vertical position, means to trap insects which are dislodged from the plants by said plant-shaking rod, a helical spring connecting the rear end of said rod to a part of said frame above said plant-shaking rod, a crank shaft, transmission means operatable by said ground-wheel for rotating said crank-shaft, a pitman-rod having one end pivoted to said crank-shaft, a lever fulcrumed to said main frame and pivoted to said pitman-rod, and a link having one end pivoted to the said lever and its other end connected to said plant-shaking rod for actuating the latter.

4. In a machine of the character described, two lower frame sections spaced from one another to permit them to move along a row of plants, an upper frame section spanning the space between the lower frame sections and securing them in substantially fixed relation to one another, insect-traps carried by said lower frame sections, a bent rod formed with slots at its ends and having a bight at its middle portions between the bight and slotted ends being approximately parallel but somewhat convergent toward said bight, headed fasteners each extending through one of said slots into the front part of one of said lower frame sections, so that said bent rod spans the space between the lower frame sections and is movably secured to these frame sections, said bent rod being upwardly and rearwardly inclined from its front ends to effect the raising of the plant-stems and support them in a position above the said insect-traps, means yieldingly connecting said bight to said upper frame section for supporting the rear end of the bent rod while permitting it to oscillate, and means to oscillate said bent rod laterally of said space between the lower frame sections.

In testimony whereof I have hereunto set my hand.

JAMES MONRO DRAKE.